United States Patent [19]
Vecht et al.

[11] Patent Number: 5,376,783
[45] Date of Patent: Dec. 27, 1994

[54] POWER METER WITH BACKGROUND SUBTRACTION

[75] Inventors: Jacob J. Vecht; Ben-Zion Halperin; Ephraim Greenfield, all of Jerusalem, Israel

[73] Assignee: Ophir Optronics Ltd., Jerusalem, Israel

[21] Appl. No.: 231,884

[22] Filed: Apr. 24, 1994

Related U.S. Application Data

[63] Continuation of Ser. No. 945,693, Sep. 16, 1992, abandoned.

[51] Int. Cl.5 ............................................. H01J 40/14
[52] U.S. Cl. ................ 250/208.2; 250/214 C; 250/214 B; 356/222
[58] Field of Search ......... 250/208.2, 214 AL, 214 B, 250/214 C, 214 R, 205; 356/218, 221, 222, 226

[56] References Cited

U.S. PATENT DOCUMENTS

| | | | |
|---|---|---|---|
| 3,601,614 | 8/1971 | Platzer, Jr. | 250/214 B X |
| 4,309,604 | 1/1982 | Yoshikawa et al. | 356/222 X |
| 4,712,000 | 12/1987 | Yoshikawa et al. | 250/205 |
| 4,870,264 | 9/1989 | Beha | 356/222 X |
| 4,982,081 | 1/1991 | Schmidt | 250/208.2 |
| 5,029,276 | 7/1991 | Buehler et al. | 250/208.2 |
| 5,114,228 | 5/1992 | Greenfield et al. | 356/222 |
| 5,117,099 | 5/1992 | Schmidt | 250/208.2 |
| 5,266,792 | 11/1993 | Crowne et al. | 250/214 C |

*Primary Examiner*—David C. Nelms
*Assistant Examiner*—John R. Lee
*Attorney, Agent, or Firm*—Brumbaugh, Graves, Donohue & Raymond

[57] ABSTRACT

A technique for performing background suppression in photodiode detectors is disclosed. A first detector measures the light emitted by the source to be measured and the background light, while a second detector simultaneously measures the background light only. The value measured by the second detector is subtracted from the value measured by the first detector, and the difference represents the portion of the first detector's measured value which is attributable to the source to be measured.

33 Claims, 2 Drawing Sheets

5,376,783

POWER METER WITH BACKGROUND SUBTRACTION

RELATED APPLICATIONS

This application is a continuation of application Ser. No. 07/945,693, filed Sep. 16, 1992, now abandoned.

FIELD OF THE INVENTION

This invention relates to photodiode detectors, and more particularly to background suppression in photodiode detectors.

BACKGROUND OF THE INVENTION

Photodiode detectors are widely used to detect and measure low level light signals. A common use of these photodiode detectors is as laser power meters.

When measuring the light from a source to be measured. photodiode detectors also measure the ambient background light. This results in readings which are higher than the light level emitted by the source to be measured. Moreover, since the background light level is not known, it is impossible to determine which portion of the measured light was emitted by the source to measured and which is measured background light. This problem can be alleviated by taking the measurements in a darkened room, but requiring a darkened room has the obvious disadvantage of severely limiting where the measurement can be made.

Another way of alleviating this problem is background subtraction. In background subtraction, a first measurement is made of only the background light, and the detector is zeroed at the measured light level. Then a second measurement is made of the light from the source to be measured and the background light, and since the detector is zeroed at the background level, the detector's output represents the light level of the source to be measured.

Background subtraction, however, requires that two measurements be taken in order to determine the light level of the source to be measured. Moreover, if the background level changes between the first measurement and the second measurement, the detector will provide inaccurate readings since the detector will be zeroed at the background level measured during the first measurement rather than at the actual background level present during the second measurement. The background level can change between the first and second measurement either because of changes in the background or because the detector is moved to a new location with a different background.

SUMMARY OF THE INVENTION

The invention seeks to provide a photodiode detector with automatic background suppression which remains accurate even when the background level changes.

In order to achieve this object, the invention performs two simultaneous measurements. The first measurement measures the light emitted by the source to be measured as well as the background light. The second measurement measures the background light only. The value measured during the second measurement is subtracted from the value measured during the first measurement to determine the amount of light emitted by the source to be measured.

There is thus provided in accordance with a preferred embodiment of the invention a first optical detector having apparatus for generating a first signal representative of a first light level, and a second optical detector having apparatus for generating a second signal representative of a second light level.

Further in accordance with a preferred embodiment of the present invention, there is provided subtraction circuitry for generating a third signal proportional to the difference between the first and second signals.

Additionally, in accordance with a preferred embodiment of the present invention, the optical detectors each comprise a photodiode.

Additionally, in accordance with a preferred embodiment of the present invention, the first and second signals are currents.

Additionally, in accordance with a preferred embodiment of the present invention, the two photodiodes are connected such that each photodiode's anode is connected to the other photodiode's cathode.

Additionally, in accordance with a preferred embodiment of the present invention, the anodes of the first and second photodiodes are connected to a display means.

Additionally, in accordance with a preferred embodiment of the present invention, the optical detectors each comprise a photodiode and an amplifier.

Additionally, in accordance with a preferred embodiment of the present invention, the first signal is a voltage between a first node and ground, the second signal is a voltage between a second node and ground, and the third signal is a voltage measured between the first and second nodes.

Additionally, in accordance with a preferred embodiment of the present invention, the invention provides matching circuitry operative to compensate for differences in sensitivity between the first and second detectors.

Additionally, in accordance with a preferred embodiment of the present invention, the first optical detector detects the light emitted by both the source and the background and the second optical detector only detects the light emitted by the background.

Additionally, in accordance with a preferred embodiment of the present invention, the invention provides a housing, a first detector housed in the housing such that it receives both the light from the source and the light from the background, the first detector providing a first signal representative of the light it receives, and a second detector housed in the housing such that it receives only the light from the background, the second detector providing a signal representative of the light it receives.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
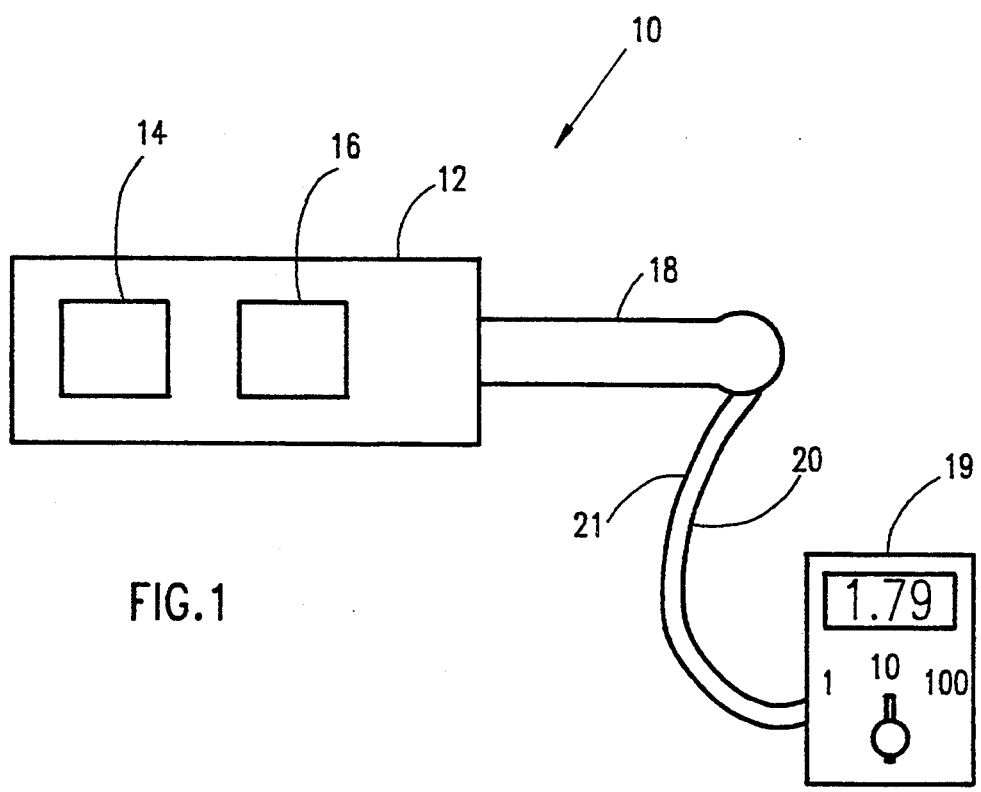
FIG. 1 shows a preferred embodiment of the photodiode detector of the present invention.

As shown in FIG. 1, a photodiode detector 10 comprises a housing 12 which houses a measuring detector 14 and a compensating (background subtraction) detector 16. A handle 18 is attached to housing 12. A pair of wires 20 and 21 run through handle 18 and electrically connect detectors 14 and 16 to a display 19.

Figure 2:
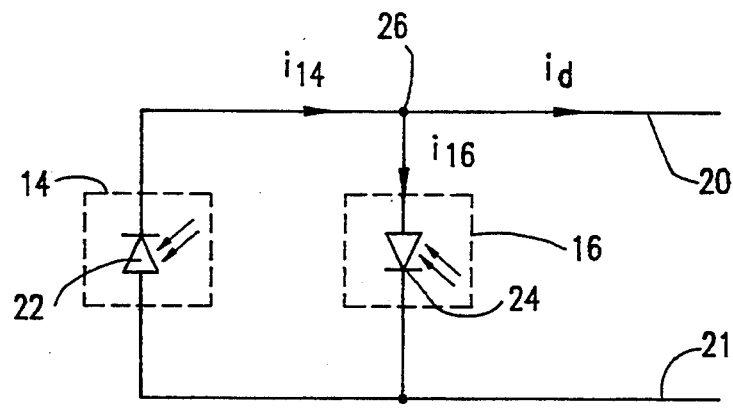
FIG. 2 shows a circuit diagram of one embodiment of the photodiode detector shown in FIG. 1.

As shown in FIG. 2, measuring detector 14 preferably comprises a photodiode 22 with its anode connected to wire 21 and its cathode connected to wire 20. Photodiode 22 could be, for example, a Hammamatsu photodiode model S1337-1010BR. Compensating Detector 16 comprises a photodiode 24 (identical to photodiode 22) with, in one embodiment of the invention, its anode connected to wife 20 and its cathode connected to wife 21.

During operation, measuring detector 14 is exposed to the light from the source to be measured and to the background light, and compensating detector 16 is exposed to only the background light. Since photodiodes 22 and 24 are identical, the component of the current in photodiode 22 which is due to the background light is substantially equal to the total current through photodiode 24. Therefore, by subtracting the (background) current through photodiode 24 from the current through photodiode 22, the component of the current in photodiode 22 which is due to the light from the source to be measured can be found. This subtraction is performed at a node 26. Display 19, which is connected to wires 20 and 21, measures the difference current, and displays a value, derived from this difference current, which is representative of the power from the source to be measured.

In this way the invention automatically subtracts the background light's contribution to the total measured light, and provides a current to the display which accurately represents the light emitted by the source to be measured.

Figure 3:
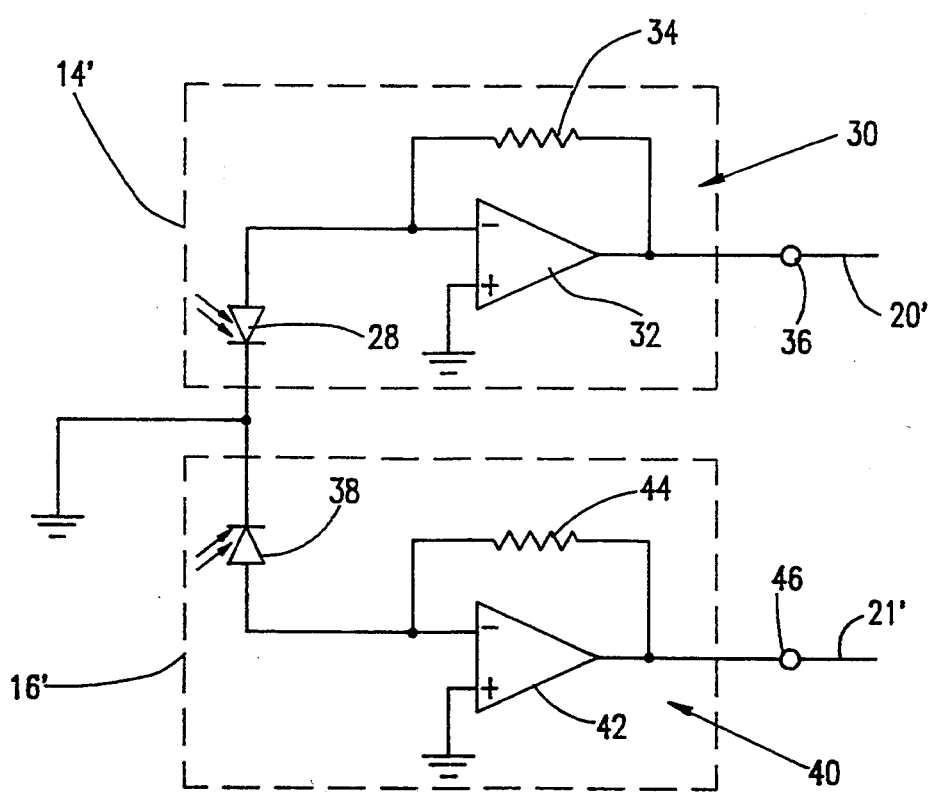
FIG. 3 shows a circuit diagram of a second embodiment of the photodiode detector shown in FIG. 1.

In another preferred embodiment of the invention, detector 10 supplies a voltage signal (rather than a current signal) to display 19. In this preferred embodiment, as shown in FIG. 3, measuring detector 14' comprises a photodiode 28 and an amplifier 30. Photodiode 28 has its anode connected to the input of amplifier 30 and its cathode connected to ground. Amplifier 30 comprises an operational amplifier 32 and a feedback resistor 34, and operates to convert the current through photodiode 28 into a voltage at a node 36. Compensating detector 16' comprises a photodiode 38 (identical to photodiode 28) and an amplifier 40 (identical to amplifier 30). Photodiode 38 has its anode connected to the input of amplifier 40 and its cathode connected to ground. Amplifier 40 comprises an operational amplifier 42 and a feedback resistor 44, and operates to convert the current through photodiode 58 into a voltage at a node 46.

During operation, diode 28 of measuring detector 14' is exposed to the light from the source to be measured and to the background light, and diode 38 of compensating detector 16' is exposed to only the background light. Since photodiodes 28 and 38 and amplifiers 30 and 40 are identical, the component of the voltage at node 36 which is due to the background light is equal to the voltage at node 46. Therefore, by subtracting the voltage at node 46 from the voltage at node 36, the component of the voltage at node 36 which is due to the light from the source to be measured can be found. The voltage between nodes 46 and 36 is just this difference.

Display 19 measures this voltage and displays a value, derived from the voltage, which is representative of the power from the source to be measured.

As in the first embodiment, the second embodiment of the invention automatically subtracts the background light's contribution to the total measured light, and provides a voltage to the display which accurately represents the light emitted by the source to be measured.

In the preferred embodiments described above, the photodiodes of measuring detector 14 compensating detector 16 must be identical (i.e. matched) so that the current through the photodiode of compensating detector 16 will accurately represent the component of the current through the photodiode of measuring detector 14 which is due to the background light. Although it is generally not difficult to get substantially matched photodiodes, under certain circumstances matched photodiodes will not be available or more accurate background subtraction may be required. Therefore, in another preferred embodiment, the invention provides a detector system which can perform automatic background suppression using unmatched photodiodes.

Figure 4:
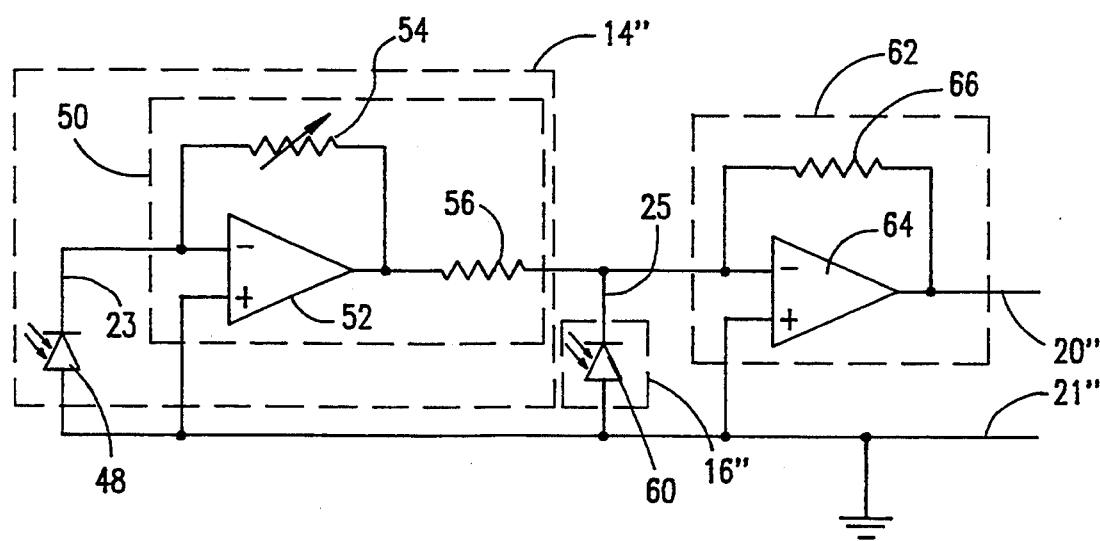
FIG. 4 shows a circuit diagram of a third embodiment of the photodiode detector shown in FIG. 1.

In this preferred embodiment, as shown in FIG. 4, measuring detector 14" comprises a photodiode 48 and a matching amplifier circuit 50. Circuit 50 comprises an operational amplifier 52 and two resistors 54 and 56. The current generated by photodiode 48 is fed to the inverting input of operational amplifier 52, with the non-inverting input connected to ground. Resistor 54 is connected as a feedback resistor for operational amplifier 52, and resistor 56 is connected between the output of operational amplifier 52 and the inverting input of an amplifier 62. One of the resistors 54 or 56 is implemented as a variable resistor. In the particular embodiment shown in FIG. 4, resistor 54 is chosen to be the variable resistor. Compensating detector 16" comprises a photodiode 60 which has its anode connected ground and its cathode connected the inverting input of amplifier 62. Amplifier 62 as a buffer and summing amplifier.

By controlling the gain of matching circuit 50, the sensitivity of measuring detector 14 and compensating circuit 16 can be matched, so that when the radiation intensity incident on the two detectors is the same, there will be zero signal at line 20". The gain of matching circuit 50 can be adjusted by changing the resistance of resistor 54. When resistor 54 is set at a value which matches the sensitivity of diodes 48 and 60, line 20" provides a voltage with a value proportional to the source being measured, to the display unit.

In another preferred embodiment of the detector of FIG. 4, amplifiers 50 and 62 could be located in display 19, rather than in housing 12. In such an embodiment, photodiodes 48 and 60 would be connected to display 19 via a 3-wire connection comprising wires 21", 23, and 25.

Table 1 shows data collected during experiments performed using a photodiode detector implemented in accordance with the teachings of the embodiment of FIG. 2 with substantially matched diodes. As can be seen in table 1, the photodiode detector achieved at least 98% background suppression under a wide range of background light conditions.

TABLE 1

| SITUATION | READING WITH SUBTRACTION | BACKGROUND LIGHT | SUPPRESSION |
|---|---|---|---|
| PROBE HORIZONTAL IN FLUORESCENT | <4 µW | 200–300 µW | 98–99.5% |

TABLE 1-continued

| SITUATION | READING WITH SUBTRACTION | BACKGROUND LIGHT | SUPPRESSION |
|---|---|---|---|
| ROOM LIGHT PROBE VERTICAL IN FLUORESCENT ROOM LIGHT | <6 μW | 400–500 μW | 98.5–99.7% |
| PROBE HORIZONTAL IN FULL DAYLIGHT | <50 μW | 5 mW | 99–100% |

In the preferred embodiments described above, photodiodes are used to detect light and provide a signal representative of the amount of detected light. As will be appreciated by those skilled in the art, however, any photosensitive detector, such as a photoresistor, could be substituted for the photodiodes in the above embodiments.

Furthermore, the particular circuit diagrams described above merely represent preferred embodiments, and many other circuits for implementing the present invention will occur to those skilled in the art upon reading this disclosure.

In alternative preferred embodiments of the invention, the display device may comprise peak detection circuitry for detecting the peak light output of the source or an oscilloscope for displaying the time dependent light output of the source being measured.

Also, while a specific embodiment of detector 10 is shown in FIG. 1, it will be clear to those skilled in the art that many other embodiments of the detector's housing, handle, etc. could be substituted for the ones shown in FIG. 1.

Also, while the detector's output has been shown and described as being supplied to a display, those skilled in the art will recognize that the detector's output could alternatively be supplied to a processor or any other device which uses the measurements of a photodiode detector.

Therefore, the scope of the present invention is defined only by the claims that follow.

We claim:

1. A background insensitive light detector for measuring the intensity of light emitted from a source in the presence of background light, comprising:
    first and second detectors for simultaneously measuring the sum of the light incident thereon emitted by a source and background light and incident background light only, respectively, and producing an output signal having an amplitude proportional thereto,
    electronic circuit means connected to said first and second detectors for determining the difference between the amplitudes of said output signals of said first and second detectors and producing a third signal the amplitude of which is representative of the intensity of the light emitted by said source, and
    means for displaying said amplitude of said third signal for grounding a visual indication of the intensity of the light emitted by said source.

2. The light detector according to claim 1, wherein said first detector comprises a first photodiode, and said second detector comprises a second photodiode.

3. The light detector according to claim 2, wherein the output signals of said first and second detectors are current signals.

4. The light detector according to claim 3, wherein said first photodiode and said second photodiode are connected in parallel, and the cathode of each photodiode is connected to the anode of the other photodiode.

5. The light detector according to claim 2, wherein said first detector further comprises a first amplifier electrically connected to said first photodiode for amplifying current signals produced by said first photodiode and said second detector further comprises a second amplifier electrically connected to said second photodiode for amplifying current signals produced by said second photodiode.

6. The detector of claim 5, wherein the cathodes of said first and second photodiodes are connected together and to a source of ground potential,
    wherein the anodes of said first and second photodiodes are respectively connected to an input terminal of said first and second amplifiers, the output terminals of which comprise first and second nodes, respectively.
    wherein said first output signal is a voltage measured between said first node and ground, said second output signal is a voltage measured between said second node and ground, and said third signal is a voltage measured between said first node and said second node.

7. The light detector according to claim 2, wherein said detector further comprises a variable gain amplifier connected in series with said first photodiode, and wherein said series-connected first photodiode and said variable gain amplifier is connected in parallel with said second photodiode.

8. The light detector according to claim 1, wherein said electronic circuitry means includes subtraction circuitry which receives said output signals from said first and second detectors and produces said third signal the amplitude of which is proportional to the difference between said output signals.

9. The light detector according to claim 1, wherein said electronic circuit means includes compensation circuitry for adjusting the amplitude of at least one of the output signals of said first and second detectors to compensate for differences in sensitivity in said first and second detectors.

10. The light detector according to claim 1, wherein said electronic circuit means includes matching circuitry receiving the signal of one of said first and second detectors and providing a matched signal equal to the signal which the other detection would have provided if it has been exposed to the light incident on the one detector, and
    subtraction circuitry which receives the matched signal and the output signal of the detector and produces said third signal the amplitude of which is proportional to the difference between the matched signal and the output signal of the other detector.

11. The light detector according to claim 10, wherein said matching circuitry comprises a variable gain amplifier receiving the signal from one of the first and second detectors and providing a matched signal, and subtraction circuitry responsive to the matched signal and the output signal from at least one of the first and second detectors, and producing an electrical signal proportional to the differences between the matched signal and the output signal from at least one of the first and second detectors.

12. A detector according to claim 1, wherein said means for displaying comprises an oscilloscope type display for displaying said third signal.

13. A detector according to claim 1, wherein said display means is operative to provide an indication of the peak value of said third signal.

14. A method of detecting the level of light emitted by a source, the source being located in a background which is also emitting light, comprising the steps of:
   a. supplying the light from the source and the light from the background to a first photodetector, the first photodetector providing a first signal;
   b. supplying the light from the background to a second photodetector, the second photodetector providing a second signal;
   c. subtracting the second signal from the first signal to form a difference signal indicative of the strength of the source; and
   d. visually indicating the measured strength of the source in response to said difference signal.

15. A method according to claim 14 wherein the step of visually indicating includes the step of providing an oscillographic display of the measured strength of the source as a function of time.

16. A method according to claim 14 wherein the step of visually indicating includes the step of visually indicating the peak measured strength of the source.

17. A detector for detecting light from a source to be measured in the presence of background light, comprising:
   a. a hand held housing;
   b. a first detector, housed in said housing such that it will receive both the light from the source to be measured and the background light, the first detector providing a first signal representative of the light received thereby;
   c. a second detector, housed in said housing such that it will simultaneously receive only the background light, the second detector providing a second signal representative of the light received thereby;
   d. subtraction circuitry which receives the first and second signals and produces a third signal proportional to the difference between said first and second signals; and
   e. display means for providing a visual display in response to said third signal.

18. A detector according to claim 17, wherein said display means comprises an oscilloscope type display for displaying said third signal.

19. A detector according to claim 17, wherein said display means is operative to provide an indication of the peak value of said third signal.

20. A background insensitive light detector for measuring light to be detected in the presence of background light, comprising:
   a first detector producing a first signal responsive to the light to be measured and the background light;
   a dynamic background light detector producing a second signal responsive only to the background light;

circuitry receiving the first and second signals and producing a third signal representative of the power of the light to be measured; and a display operative to provide a visual display responsive to the third signal.

21. A detector according to claim 20 wherein the first detector comprises a first diode and the second detector comprises a second diode.

22. A detector according to claim 21 wherein the first and second signals are current signals.

23. A detector according to claim according to claim 22 wherein the first photodiode and the second photodiode are connected in parallel, the cathode of each photodiode being connected to the anode of the other photodiode.

24. A detector according to claim 21 wherein the first detector further comprises a first amplifier and the second detector comprises a second amplifier.

25. A detector according to claim 24 wherein the first signal is a voltage measured between a first node and a common node, the second signal is a voltage measured between a second node and the common node and the third signal is a voltage measured between the first node and the second node.

26. A detector according to claim 21 wherein the first detector further comprises a variable gain amplifier connected in series with the first photodiode and wherein the series-connected first diode and variable gain amplifier is connected in parallel with the second diode, 27. A detector according to claim 20 wherein the circuitry comprises subtraction circuitry which produces the third signal which is a signal proportional to the difference between the first and second signals.

28. A detector according to claim 20 wherein the circuitry further comprises compensation circuitry which adjusts at least one of the first and second signal to compensate for differences in sensitivity between the first and second detectors.

29. A detector according to claim 20 wherein the circuitry further comprises matching circuitry receiving signal of one of the first and second detectors and producing a matched signal equal to the signal which the other detector would have produced if it had been exposed to the light incident on the one detector; and subtraction circuitry responsive to the matched signal and the output signal of the other detector and producing the third signal the amplitude of which is proportional to the difference between the matched signal and the output of the other detector.

30. A detector according to claim 29 wherein the matching signal comprises a variable gain amplifier.

31. A detector according to claim 20 wherein the display is operative to provide an indication of the peak value of the third signal.

32. A detector for detecting light from a source to be measured in the presence of background light, comprising:
   a. hand held housing;
   b. a first detector, housed in the housing such that it will receive both the light from the source to be measured and the background light, the first detector providing a first signal representative of the light received thereby;
   c. a second detector, housed in the housing such that it will receive only the background light, the second detector providing a second signal representative of the light received thereby;

d. subtraction circuitry which receives the first and second signals and produces a third signal proportional to the difference between the two signals; and e. a display operative to provide a visual display responsive to the third signal.

33. A detector according to claim 32 wherein the display is operative to provide an indication of the peak value of the third signal.

* * * * *

UNITED STATES PATENT AND TRADEMARK OFFICE
CERTIFICATE OF CORRECTION

PATENT NO. : 5,376,783
DATED : December 27, 1994
INVENTOR(S) : Vecht et al.

It is certified that error appears in the above-indentified patent and that said Letters Patent is hereby corrected as shown below:

Title page, Item 22, "Apr. 24, 1994" should read --Apr. 22, 1994--;

Column 3, line 11, "wife" (both occurrences) should read --wire--;

Column 4, line 39, "as" should read --acts as--;

Signed and Sealed this

Thirty-first Day of October 1995

Attest:

BRUCE LEHMAN

*Attesting Officer*  *Commissioner of Patents and Trademarks*